US010726224B2

(12) United States Patent
McCloskey et al.

(10) Patent No.: US 10,726,224 B2
(45) Date of Patent: Jul. 28, 2020

(54) AUTHENTICABLE DIGITAL CODE AND ASSOCIATED SYSTEMS AND METHODS

(71) Applicant: Authentic Labs, Denver, CO (US)

(72) Inventors: David C. McCloskey, Erie, CO (US); John Robert Blakely, Niwot, CO (US); Stanley R. James, San Francisco, CA (US)

(73) Assignee: Authentic Labs, Denver, CO (US)

( * ) Notice: Subject to any disclaimer, the term of this patent is extended or adjusted under 35 U.S.C. 154(b) by 0 days.

(21) Appl. No.: 16/394,466

(22) Filed: Apr. 25, 2019

(65) Prior Publication Data

US 2019/0251314 A1 Aug. 15, 2019

Related U.S. Application Data

(63) Continuation of application No. 15/630,318, filed on Jun. 22, 2017, now Pat. No. 10,318,775.
(Continued)

(51) Int. Cl.
*G06K 7/10* (2006.01)
*G06K 5/02* (2006.01)
(Continued)

(52) U.S. Cl.
CPC .......... *G06K 7/10722* (2013.01); *G06K 5/02* (2013.01); *G06K 7/1417* (2013.01);
(Continued)

(58) Field of Classification Search
CPC ............ G06K 7/10722; G06K 7/1414; G06K 19/06028; G06K 19/06037
(Continued)

(56) References Cited

U.S. PATENT DOCUMENTS

| 4,983,817 A * | 1/1991 | Dolash | B07C 3/14 |
| | | | 235/455 |
| 5,291,002 A * | 3/1994 | Agnew | B07C 3/18 |
| | | | 209/900 |

(Continued)

FOREIGN PATENT DOCUMENTS

| CN | 1726502 | 1/2006 |
| CN | 101751714 | 6/2010 |

(Continued)

OTHER PUBLICATIONS

International Search Report with Written Opinion corresponding to International Patent Application No. PCT/US2017/038356, dated Sep. 13, 2017, 8 pages.

(Continued)

*Primary Examiner* — Paultep Savusdiphol
(74) *Attorney, Agent, or Firm* — Lathrop GPM LLP (57) ABSTRACT

An authenticable digital code includes a printable medium, a machine-readable digital code, formed on the printable medium, that graphically represent information, and at least one security signature positioned relative to the machine-readable digital code. The security signature includes a fluorescent material that, when excited by light of a first wavelength, fluoresces and emits light at a second wavelength that is different from the first wave length. Authenticity of the authenticable digital code is determined by detecting, when the authenticable digital code is illuminated by light of the first wavelength, light of the second wavelength at a position relative to the machine-readable digital code.

14 Claims, 11 Drawing Sheets

Related U.S. Application Data (60) Provisional application No. 62/354,582, filed on Jun. 24, 2016.

(51) Int. Cl.
  G07D 7/1205 (2016.01)
  G06K 19/06 (2006.01)
  G07D 7/0043 (2016.01)
  G06K 7/14 (2006.01)

(52) U.S. Cl.
  CPC ... G06K 19/0614 (2013.01); G06K 19/06028 (2013.01); G06K 19/06037 (2013.01); G07D 7/0043 (2017.05); G07D 7/1205 (2017.05)

(58) Field of Classification Search
  USPC .................. 235/462.11, 462.04, 462.42, 491
  See application file for complete search history.

(56) References Cited

U.S. PATENT DOCUMENTS

| | | | |
|---|---|---|---|
| 5,402,364 A | | 3/1995 | Kitoh et al. |
| 5,691,909 A | | 11/1997 | Frey et al. |
| 5,971,276 A | | 10/1999 | Sano et al. |
| 6,512,993 B2 | | 1/2003 | Kacyra et al. |
| 6,612,494 B1 | | 9/2003 | Outwater |
| 7,599,732 B2 | | 10/2009 | Sevick-Muraca et al. |
| 7,841,264 B2 | | 11/2010 | Kim et al. |
| 8,970,867 B2 | | 3/2015 | Baldwin et al. |
| 9,751,355 B2 * | | 9/2017 | Schaede ............... B41M 3/144 |
| 2003/0112423 A1 | | 6/2003 | Vig et al. |
| 2004/0188528 A1 | | 9/2004 | Alasia et al. |
| 2005/0087605 A1* | | 4/2005 | Auslander ............... G06K 1/123 235/491 |
| 2007/0119949 A1* | | 5/2007 | Hattersley ............... G06K 7/10 235/472.01 |
| 2007/0152032 A1 | | 7/2007 | Tuschel et al. |
| 2008/0038494 A1 | | 2/2008 | Midgley et al. |
| 2010/0144387 A1 | | 6/2010 | Chou |
| 2011/0019914 A1 | | 1/2011 | Bimber et al. |
| 2011/0055053 A1 | | 3/2011 | Rutschmann |
| 2011/0075916 A1 | | 3/2011 | Knothe et al. |
| 2011/0117025 A1 | | 5/2011 | Dacosta et al. |
| 2011/0117268 A1 | | 5/2011 | Batchelder et al. |
| 2012/0157160 A1 | | 6/2012 | Ozcan et al. |
| 2013/0135081 A1 | | 5/2013 | McCloskey et al. |
| 2013/0153787 A1* | | 6/2013 | Geaghan ............... G06F 3/0317 250/458.1 |
| 2013/0157351 A1 | | 6/2013 | Ozcan et al. |
| 2013/0215168 A1 | | 8/2013 | Furness, III et al. |
| 2014/0034214 A1 | | 2/2014 | Boyer et al. |
| 2014/0043630 A1 | | 2/2014 | Buser et al. |
| 2014/0362228 A1 | | 12/2014 | McCloskey et al. |
| 2015/0014553 A1* | | 1/2015 | Lee .................... G06K 7/10722 250/461.1 |
| 2015/0213349 A1 | | 7/2015 | Downing et al. |
| 2015/0261317 A1* | | 9/2015 | Geaghan ............... G06F 3/0317 345/179 |
| 2015/0032467 A1 | | 11/2015 | Talyansky |
| 2015/0324677 A1* | | 11/2015 | Talyansky ............... G06K 19/14 235/462.07 |
| 2016/0162907 A1 | | 6/2016 | Liu et al. |
| 2016/0176224 A1* | | 6/2016 | Schaede ............... B41M 3/144 283/89 |
| 2016/0024689 A1 | | 8/2016 | Murrah et al. |
| 2016/0024700 A1 | | 8/2016 | Lewis et al. |
| 2016/0246892 A1* | | 8/2016 | Murrah ............... G06K 7/0004 |
| 2016/0247008 A1* | | 8/2016 | Lewis ................ G06K 7/10732 |

FOREIGN PATENT DOCUMENTS

| | | |
|---|---|---|
| EP | 1912059 A1 | 4/2008 |
| JP | 2005-517195 A | 6/2005 |
| JP | 2005-196627 A | 7/2005 |
| JP | 2007-328551 A | 12/2007 |
| JP | 2012-509471 | 4/2012 |
| JP | 3175377 U | 5/2012 |
| WO | 0124107 A2 | 4/2001 |
| WO | 02061405 a2 | 8/2002 |
| WO | WO 2002/093456 A2 | 11/2002 |
| WO | WO 2007/078935 A2 | 7/2007 |
| WO | 2013003815 A2 | 1/2013 |
| WO | 2014201009 A2 | 12/2014 |

OTHER PUBLICATIONS

International Search Report with Written Opinion corresponding to International Patent Application No. PCT/US2014/041719, dated Dec. 9, 2014, 14 pages.

International Search Report with Written Opinion corresponding to International Patent Application No. PCT/US2012/067459, dated Mar. 11, 2013, 10 pages.

Lou et al. (2014) "Partially Blind Deblurring of Barcode from Out-of-Focus Blur," Siam J. Imaging Sciences. 7(2):740-760.

MaxMax (Aug. 30, 2012) IR Ink, 6 pages. Accessible on the Internet at URL: <http://www.maxmax.com/aXRayiRinks.asp> [last accessed May 22, 2013].

MaxMax (Aug. 30, 2012) Up-Conversion, 3 pages. Accessible on the Internet at URL: <http://www.maxmax.com/aiRUpConversion.asp> [last accessed May 22, 2013].

New Prismatic Co. (Sep. 6, 2010) Invisible Fluorescent Material, 3 pages. Accessible on the Internet at URL: <http://www.colorchange.com.tw/english/index.php/invisible-fluorescent- introduction.html> [last accessed May 22, 2013].

Supplemental European Search Report corresponding to European Patent Application No. 14810817.8, dated Dec. 15, 2016, 8 pages.

Chinese Office Action in Chinese Patent Application No. 201480032974.6 dated Nov. 6, 2017, 11 pp.

Japanese Patent Application No. 2016-519593, English translation of Office Action dated Mar. 29, 2018, 4 pages.

Japanese Patent Application No. 2018-191883, English translation of Office Action dated Oct. 8, 2019, 6 pages.

European Patent Application No. 17816070.1, Extended Search and Opinion dated Jan. 21, 2020, 10 pages.

\* cited by examiner

AUTHENTICABLE DIGITAL CODE AND ASSOCIATED SYSTEMS AND METHODS

RELATED APPLICATIONS

This application is a continuation of U.S. patent application Ser. No. 15/630,318, titled "Authenticable Digital Code and Associated Systems and Methods," filed Jun. 22, 2017, which claims priority to U.S. Patent Application Ser. No. 62/354,582, titled "Authenticable Digital Code and Associated Systems and Methods," and filed Jun. 24, 2016. Both of these applications are incorporated herein by reference.

BACKGROUND

Products are typically packaged with a machine-readable code (e.g., a QR code, a barcode, a data matrix, and other similar codes) that identifies the product. For example, the machine-readable code may include manufacturer identification (ID), a product ID, a product serial number, and so on. However, the machine-readable code cannot provide authentication of the product it is attached to, even when containing a unique serial number, since the code itself is easily copied. That is, there is no way to ascertain whether the machine-readable code being scanned is authentic or an image duplicate. Thus, even where a consumer product is marked with the machine-readable code, the code provides no indication of authenticity of the object.

Many mobile phones and tablets include cameras for capturing pictures. These cameras typically use a CMOS (complementary metal-oxide semiconductor) sensor with an infrared (IR) cut-off filter that is designed to block near-IR photons from reaching the imaging sensor, while passing visible light. The IR cut-off filter prevents IR radiation from distorting images formed from visible radiation. While this results in more natural looking images, conventional mobile devices are therefore unsuitable for detecting fluorescent emission at IR wavelengths without removal of the included IR cut-off filter.

Many phosphors emit visible light when excited by Ultraviolet (UV) light. However, mobile phones cannot generate UV light at the appropriate wavelength and intensity to excite these phosphors. Thus, mobile phones have not been considered suitable for visible light authentication.

SUMMARY

In one embodiment, an authenticable digital code includes a printable medium, a machine-readable digital code, formed on the printable medium, that graphically represents information, and at least one security signature having a fluorescent material that, when excited by first light at a first wavelength, fluoresces and emits second light at a second wavelength, that is different from the first wavelength. The second light being emitted at a position relative to the machine-readable digital code for indicating authenticity of the authenticable digital code.

In another embodiment, a method manufactures an authenticable digital code. A code print image that graphically represents information of the authenticable digital code is generated and printed onto a printable medium using one or more visible inks to form a machine-readable digital code. A security print image that graphically represents a security signature is generated and printed onto the printable medium in a position relative to the code print image using a fluorescent material that, when excited by first light at a first wavelength, fluoresces and emits second light at a second wavelength that is different from the first wave length, the second light emitting at a position relative to the machine-readable digital code for indicating authenticity of the authenticable digital code.

In another embodiment, a system for authenticating an authenticable digital code includes a processor, a non-transitory memory communicatively coupled with the processor, a camera controlled by the processor and having a field of view, a light emitting display controlled by the processor that emits first light into the field-of-view of the camera, and software having machine-readable instructions stored in the memory that, when executed by the processor, are capable of: controlling the light emitting display to emit the first light of a first wavelength, controlling the camera to capture an image of the authenticable digital code positioned within the field of view and illuminated by the first light, analyzing the image to detect second light of a second wavelength at a position within the image relative to the machine-readable digital code resulting from fluorescence of a security signature on the authenticable digital code, and decoding and authenticating the authenticable digital code based upon the position and the second wavelength.

In another embodiment, a method authenticates an authenticable digital code. A light emitting display is controlled to emit first light of a first wavelength. A camera is controlled to capture an image of the authenticable digital code illuminated by the first light. The image is analyzed to detect second light of a second wavelength at a position within the image relative to a machine-readable digital code of the authenticable digital code and resulting from fluorescence of a security signature of the authenticable digital code. The machine-readable digital code of the authenticable digital code is decoded and authenticated based upon the position of the second light in the image relative to the machine-readable digital code within the image.

DETAILED DESCRIPTION

Visual Fluorescence Code Validation

Figure 1:
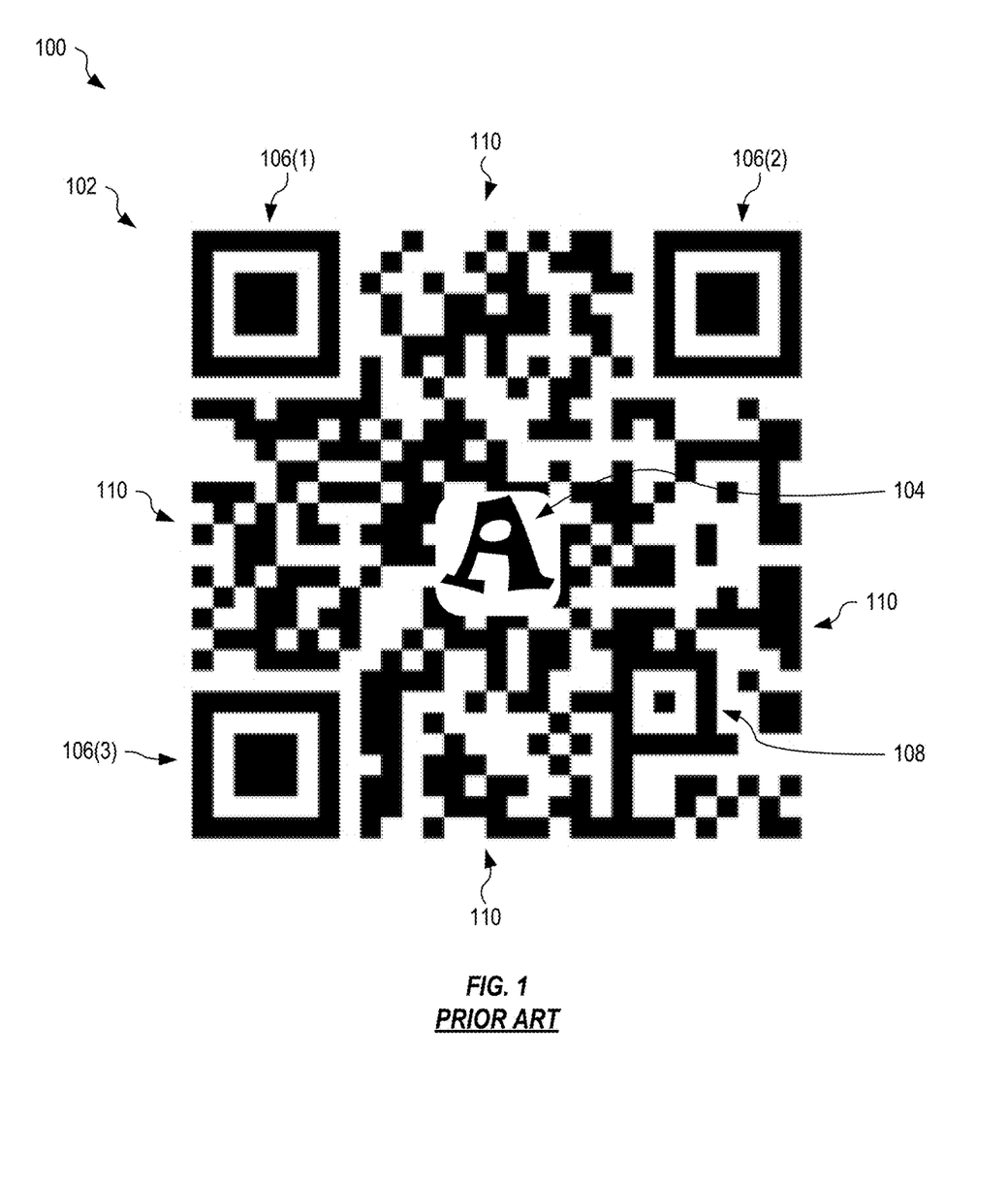
FIG. 1 shows a prior-art machine-readable digital code in the form of a QR code that includes a central logo.

FIG. 1 shows a prior-art machine-readable digital code 100 in the form of a QR code 102 that includes a central logo 104, illustratively shown as a stylistic letter "A." As known in the art, QR code 102 has three position markers 106(1)-(3), one or more alignment markers 108, and a data and timing area 110 that form the remainder of QR code 102. QR code 102 is typically printed in a black pigment on a white background to make it readable by a reading device. However, as noted above, there is no way to determine whether machine-readable digital code 100 (e.g., QR code 102) is an original or replica thereof, since the replica provides the same information to the reading device as does the original.

In the following figures, machine-readable digital codes are shown hashed, rather than solid black, for clarity of illustration. However, these hashed areas represent solid black or other colors as known in the art of machine-readable digital codes.

Figure 2:
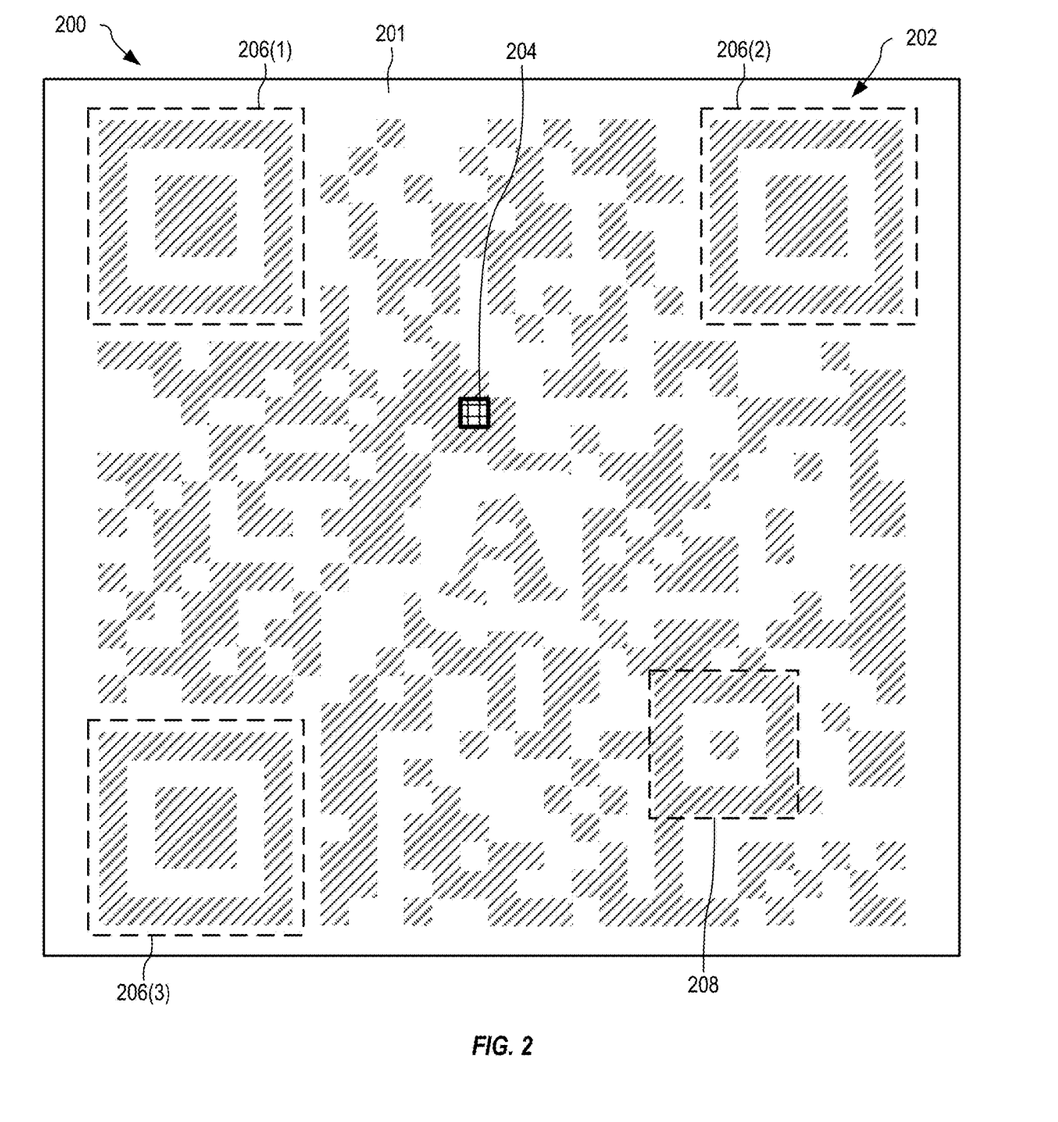
FIG. 2 is a schematic illustrating one exemplary authenticable digital code that includes a machine-readable digital code and a security signature formed on a printable medium, in an embodiment.

FIG. 2 is a schematic illustrating one exemplary authenticable digital code 200 that includes a machine-readable digital code 202 and a security signature 204 formed on a printable medium 201. Machine-readable digital code 202 is a graphical representation of information that is optically readable by a conventional prior-art reading device, using visible light for example. In the example of FIG. 2, machine-readable digital code 202 includes the same information as QR code 102 of FIG. 1. Machine-readable digital code 202 may take other graphical forms without departing from the scope hereof.

Security signature 204 is positioned relative to machine-readable digital code 202 and formed of a fluorescent material that, in response to light of a first frequency, emits light at a second frequency. In one embodiment, the fluorescent material of security signature 204 includes a phosphor that emits red light when illuminated by blue light. However, when illuminated by regular white light, security signature 204 is not easily discerned from markings of machine-readable digital code 202. In one embodiment, security signature 204 includes both a reflective component and a fluorescent component. For example, phosphor microdots used to form security signature 204 may be formed with a thin coating of pigmented reflective material of a first color, such that security signature 204 appears to be of the first color when viewed under white light, but appears to be of a second color when illuminated by light of only a certain color (e.g., blue). In another example, the quantity of phosphor microdots within security signature 204 is relatively small, and thus these phosphor micro-dots have lower visibility that other includes pigments of security signature 204 when viewed under while light. The reflective component may include a color pigment that allows security signature 204 to be visible under normal illumination conditions (e.g., white light and/or day light). The fluorescent component allows security signature 204 to be detected when illuminated by light of a certain color.

Figure 5:
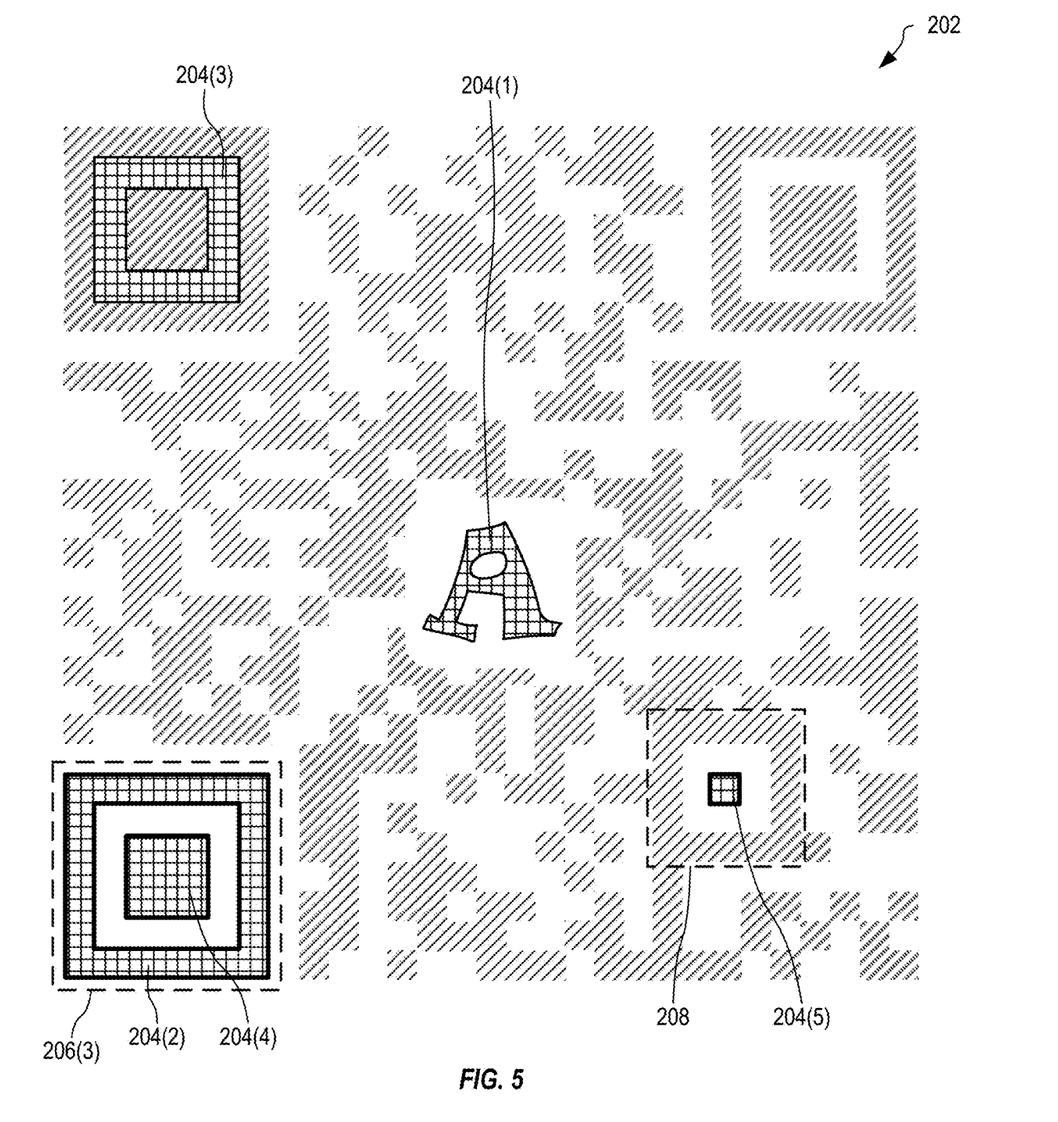
FIG. 5 shows exemplary positions, shapes and sizes of the security signature relative to the machine-readable code of FIG. 2.

In one embodiment, security signature 204 is configured to appear substantially white under normal illumination and is positioned over a white portion of machine-readable digital code 202. In an alternate embodiment, security signature 204 is configured to appear substantially black under normal illumination and is positioned over a black portion of machine-readable digital code 202. In the example of FIG. 2, the area of security signature 204 is approximately equal to the area representing one "bit" of information of machine-readable digital code 202. However, as shown in FIG. 5 and described below, security signature 204 may have other shapes and sizes without departing from the scope hereof.

Figure 3:
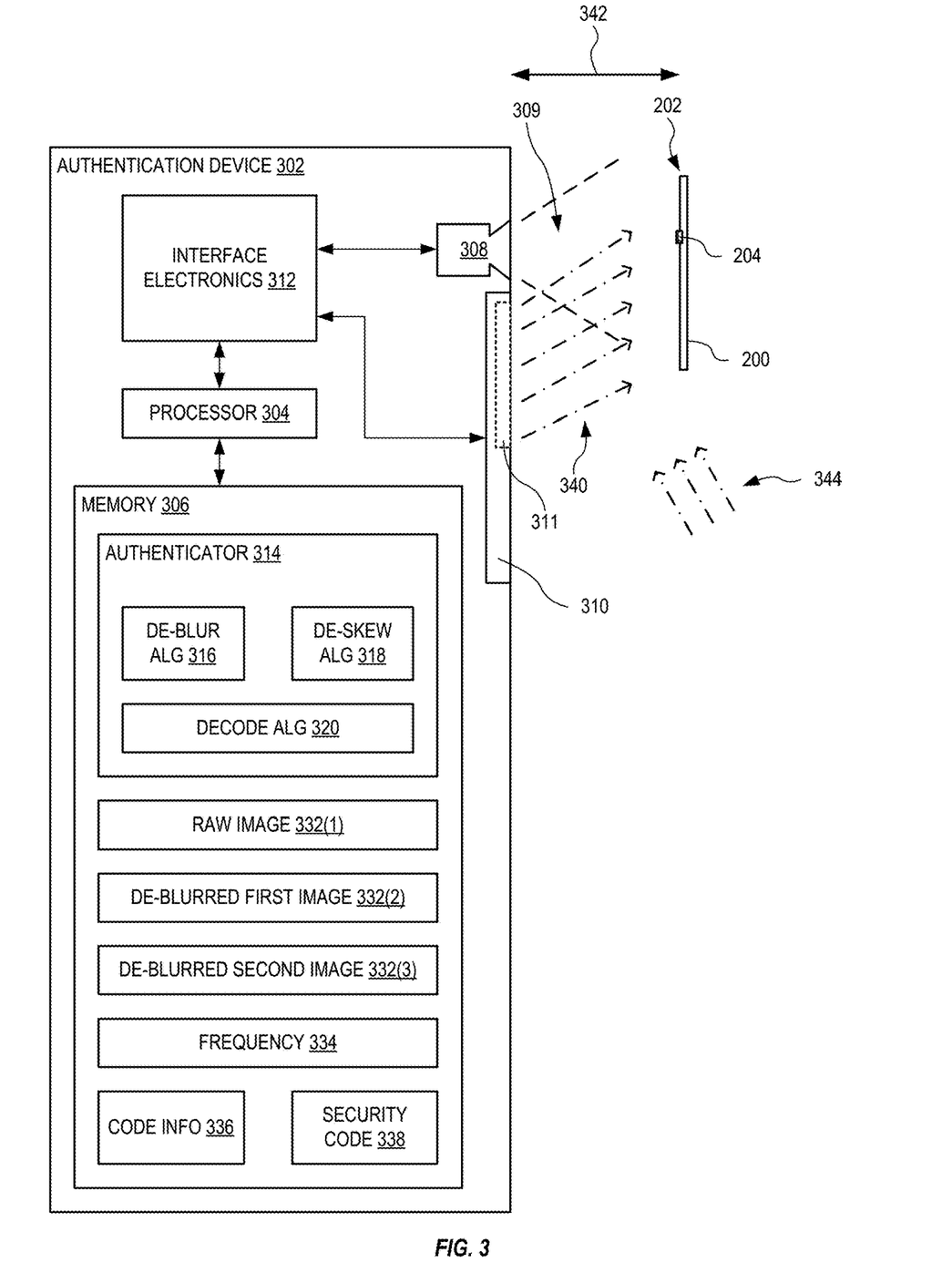
FIG. 3 shows one exemplary authentication device for authenticating the authenticable digital code of FIG. 2, in an embodiment.

FIG. 3 shows one exemplary authentication device 302 for authenticating authenticable digital code 200. Device 302 includes a processor 304 a memory 306 communicatively coupled with processor 304, a camera 308 communicatively coupled with processor 304, and a display 310 communicatively coupled with processor 304 via interface electronics 312. Display 310 is of a type that emits light, such as selected from the group including: LCD, LED, and OLED. Device 302 is for example a mobile device and may represent one or more of: a smart phone, a personal digital assistant, a tablet computer, a laptop computer, a notebook computer, an MP3 player, and a smart television.

Camera 308 is positioned such that objects (e.g., authenticable digital code 200) positioned within the field of view of camera 308 are also in front of, and illuminated by light from, display 310. For example, where device 302 is a smart phone, camera 308 is a forward-facing camera of the smart phone and display 310 is the display of the smart phone where the camera and the display face the same direction. Display 310 is controlled by processor 304 to display graphical and textual information and may incorporate touch sensitivity to receive input from a user.

Device 302 also includes an authenticator 314, implemented as machine-readable instructions stored in memory 306 and executed by processor 304, that controls camera 308 and display 310 to authenticate authenticable digital code 200. In one embodiment, where device 302 is a smart phone or tablet type device, authenticator 314 is an "app" that is downloaded and run on the smart phone or tablet type device. Device 302 may be other such similar devices without departing from the scope hereof. It should be noted that device 302 requires no additional filters or light sources when authenticating digital code 200.

As shown in FIG. 3, authenticable digital code 200 is positioned in front of both camera 308 and display 310 such that authenticable digital code 200 is within a field of view 309 of camera 308 and receives light 340 emitted from at least a portion 311 of display 310. Authenticator 314 controls display 310 to selectively illuminate authenticable digital code 200 and controls camera 308 to capture one or more images 332 of authenticable digital code 200 while illuminated. Authenticator 314 then processes images 332 to determine authenticity of authenticable digital code 200.

Authenticable digital code 200 is positioned a distance 342 from camera 308 and display 310 such that light 340 from display 310 is more influential upon authenticable digital code 200 than ambient light 344. However, depending upon capabilities of camera 308 and display 310, distance 342 may be outside an operational focus range of camera 308, such that a raw image 332(1) captured of code 200 is blurred. Authenticator 314 may therefore include a de-blur algorithm 316 that is invoked to de-blur raw image 332(1) to form de-blurred first image 332(2). Optionally, authenticator 314 may also include a de-skew algorithm 318 that may be invoked by authenticator 314 to de-skew and straighten an image of authenticable digital code 200 within de-blurred first image 332(2), such that the captured image of authenticable digital code 200 is consistently shaped, sized and oriented within de-blurred first image 332(2).

First Authentication Level

At a first authentication level, device 302 detects presence of expected fluorescence from security signature 204, wherein the detected presence of fluorescence at the expected wavelength (frequency) indicates the first authentication level of digital code 200 has been passed. Where only simple authentication of authenticable digital code 200 is required, authenticable digital code 200 may be determined as authentic.

Second Authentication Level

Where stronger authentication of authenticable digital code 200 is needed, further analysis of security signature 204 may be performed, once the presence of security signature 204 is verified. At a second authentication level, device 302 performs further evaluations of security signature 204 based upon position.

Within authenticable digital code 200, security signature 204 may be positioned at a predefined location relative to machine-readable digital code 202. For example, as shown in FIG. 2, security signature 204 is within code 202 and positioned relative to position markers 206 and alignment marker 208 such that by identifying the location of two or more of position markers 206 and alignment marker 208 within a captured image (e.g., image 332), the location of security signature 204 within the image may also be determined. Where security signature 204 is not positioned at the predefined location, authenticable digital code 200 is not authenticated. In one embodiment, the predefined relative position of security signature 204 relative to machine-readable digital code 202 does not change for different information stored within the machine-readable digital code 202.

In one embodiment, the location of security signature 204 relative to machine-readable digital code 202 is predefined based upon information within machine-readable digital code 202. For example, for a first product identified by a first machine-readable digital code 202, security signature 204 may have a first position relative to machine-readable digital code 202 that is different from a second position of security signature 204 for a second machine-readable digital code that identifies a different product. That is, system 300 may decode machine-readable digital code 202 to determine a predefined location for security signature 204, prior to authenticating the authenticable digital code 200.

In one example of operation, where the detected position of security signature 204 relative to machine-readable digital code 202 does not match the predefined position indicated by information decoded from machine-readable code 202, authenticator 314 may determine that authenticable digital code 200 is not authentic. Thus, the position of security signature 204 within authenticable digital code 200 is thus used as an additional level of protection against copying of authenticable digital code 200.

As shown in FIG. 3, authenticator 314 may include a decode algorithm 320 that operates to decode machine-readable digital code 202 of authenticable digital code 200 to generate code information 336.

Figure 4:
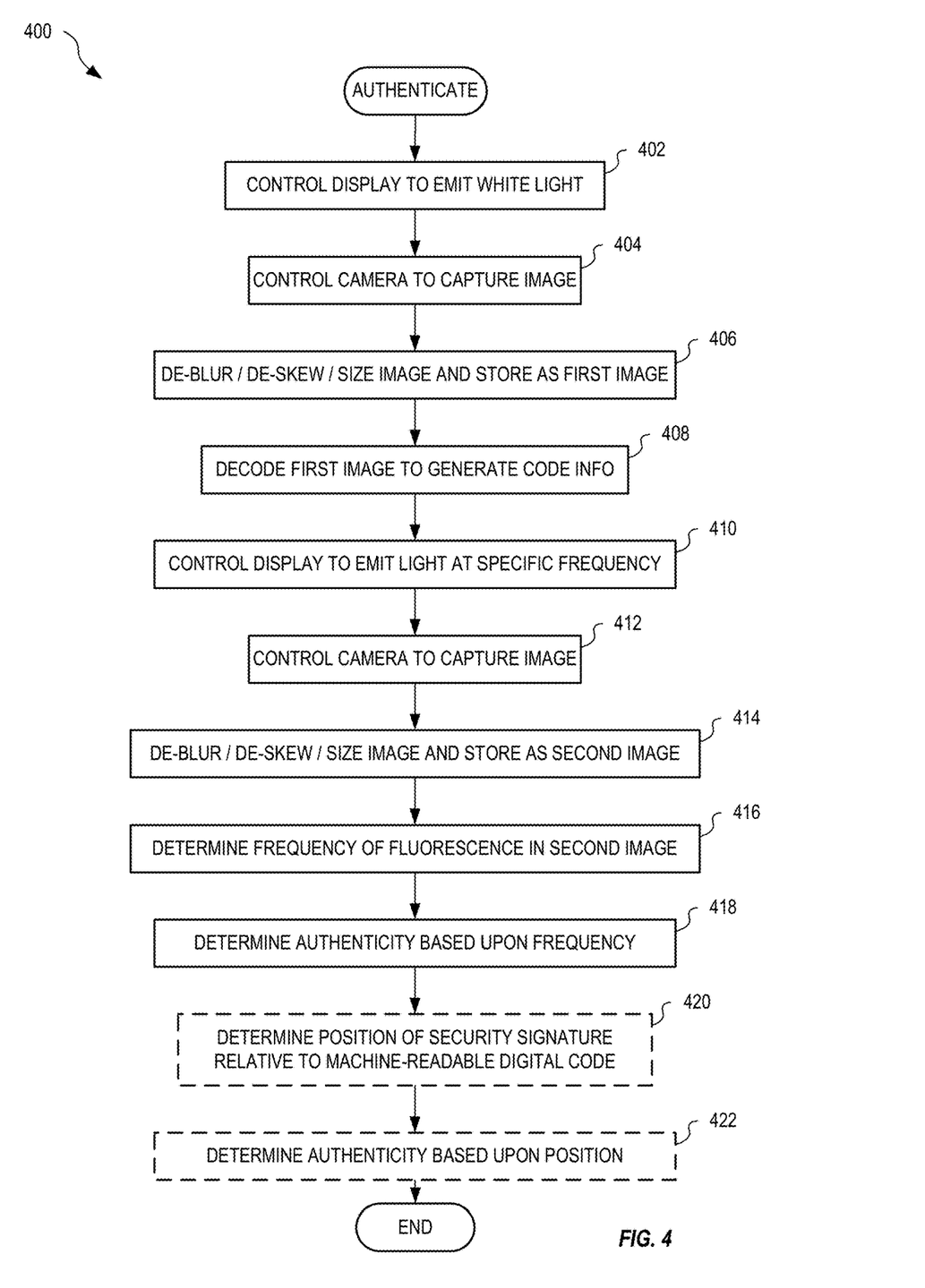
FIG. 4 is a flowchart illustrating one exemplary method for authenticating the authenticable digital code of FIG. 2, in an embodiment.

FIG. 4 is a flowchart illustrating one exemplary method 400 for authenticating authenticable digital code 200 of FIG. 2. Method 400 is implemented in authenticator 314 of FIG. 3, for example.

In step 402, method 400 controls the display of a reading device to emit white light. In one example of step 402, authenticator 314 controls portion 311 of display 310 to emit white light. In step 404, method 400 controls the camera to capture an image. In one example of step 404, authenticator 314 controls camera 308 to capture image 332(1) of authenticable digital code 200. In step 406, method 400 performs at least one of de-blur, de-skew, and sizing of the image and stores it as a first image. In one example of step 406, authenticator 314 uses one or both of de-blur algorithm 316 and de-skew algorithm 318 to de-blur, de-skew, and size image 332(1) to form de-blurred first image 332(2) such that the image of code 200 is of a standard orientation and size. In step 408, method 400 decodes the first image to generate code information. In one example of step 408, authenticator 314 invokes decode algorithm 320 to decode information of machine-readable digital code 202 from de-blurred first image 332(2) to form code information 336.

In step 410, method 400 controls the display to emit light at a specific frequency (wavelength, color, etc.). In one example of step 410, authenticator 314 controls display 310 to emit blue light 340 from portion 311. In step 412, method 400 controls the camera to capture an image. In one example of step 412, authenticator 314 controls camera 308 to capture image 332(1) of authenticable digital code 200 while illuminated by light 340. In step 414, method 400 de-blurs/de-skews/sizes the image and stores it as a second image. In one example of step 414, authenticator 314 uses one or both of de-blur algorithm 316 and de-skew algorithm 318 to de-blur, de-skew, and size image 332(1) to form de-blurred second image 332(3) such that the image of code 200 is of a standard orientation and size.

In step 416, method 400 determines a frequency of fluorescence in the second image. In one example of step 416, authenticator 314 analyzes de-blurred second image 332(3) to determine a frequency 334 of fluorescence from security signature 204 when illuminated by blue light.

In step 418, method 400 determines authenticity based upon the determined frequencies. In one example of step 418, authenticator 314 compares frequency 334 to one or more predefined expected fluorescence frequencies, where if the frequencies match, code 200 is determined as authentic.

Steps 420 and 422 are optional. If included, in step 420, method 400 determines a position of the security signature relative to the machine-readable digital code. In one example of step 420, authenticator 314 determines, from one or both of images 332(2) and 332(3), a position of security signature 204 relative to two or more of position markers 206 and alignment marker 208. If included, in step 422, method 400 determines authenticity based upon the determined position. In one example of step 422, authenticator 314 determines code 200 to be authentic when the determined position of security signature 204 relative to position markers 206 and alignment marker 208 is correct with respect to the predefined location.

Steps 410 through 418 may repeat with different specific frequencies for the light emitted from the display to determine multiple frequencies of fluorescence within the captured image of step 412. The step of determining authenticity (418) is based upon multiple frequencies. See for example FIG. 6 and the associated description below.

FIG. 5 shows exemplary positions, shapes and sizes of security signature 204 relative to machine-readable code

202. In a first example, security signature 204(1) is shaped, sized and positioned over a logo (e.g., logo 104). In a second example, security signature 204(2) is shaped, sized and positioned over an outer portion of a position marker 206 (e.g., position marker 206(3)). In a third example, security signature 204(3) is shaped, sized and positioned between portions of a position marker 206 (e.g., position marker 206(1)). In a fourth example, security signature 204(4) is shaped, sized and positioned over an inner portion of a position marker 206 (e.g., position marker 206(3)). In a fifth example, security signature 204(5) is shaped, sized and positioned over an inner portion of an alignment marker 208. The shape and size of security signature 204 is not limited to the shown examples and may be positioned elsewhere on machine-readable code 202 without departing from the scope hereof.

Multiple Frequency Response Analysis

In one embodiment, authenticator 314 controls camera 308 to capture images of code 200 when illuminated by light 340 of differing frequencies (e.g., different colors emitted from display 310). Authenticator 314 then determines the fluorescence response from security signature 204 for each of the different frequencies used to excite the fluorescence.

Detailed Response Analysis

Figure 6:
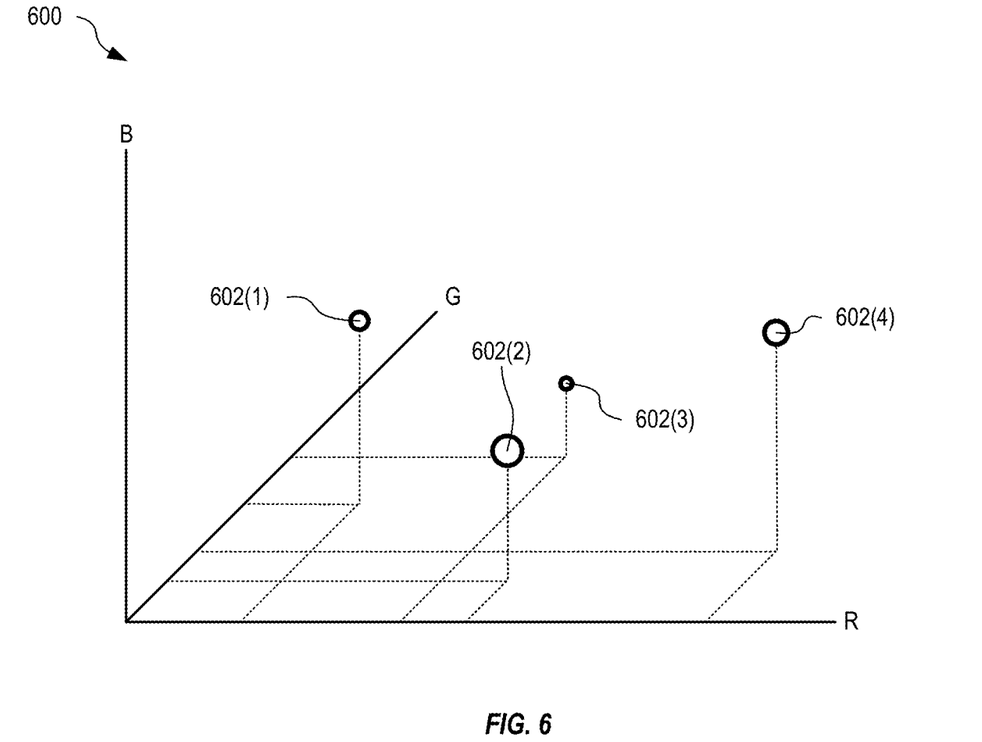
FIG. 6 is a color space graph displaying exemplary captured color responses from the security signature of FIG. 2 for four different excitation frequencies, in an embodiment.

FIG. 6 is a color space graph 600 having three axes, red (R), green (G), and blue (B), and displaying exemplary determined responses 602 from security signature 204 for four different excitation frequencies. Authenticator 314 controls camera 308 to capture a first image of authenticable digital code 200 while controlling display 310 to emit light of a first frequency from at least portion 311. Authenticator 314 then analyses this first image to determine a first color, plotted as response 602(1) on graph 600, emitted by security signature 204. Authenticator 314 repeats this process, emitting light of second, third and fourth colors from at least portion 311 of display 310 while capturing images of authenticable digital code 200, and determining second, third, and fourth colors, plotted as responses 602(2), 602(3), and 602(4), respectively, on graph 600. As shown, the detected color of security signature 204 varies, depending upon the color of the illuminating light. This response is unique to the composition of security signature 204, and thus by determining the color response for multiple different illuminations colors, authenticator 314 may better authenticate authenticable digital code 200. As described above, phosphor micro-dots may be coated with a pigmented material to influence the response of security signature 204 to different illuminating wavelengths. Where a color response is not as expected for a particular color of light, authenticator 314 may determine that the presented digital code is not authentic, even when it does incorporate a fluorescent material.

Secondary Security Codes

Figure 7:
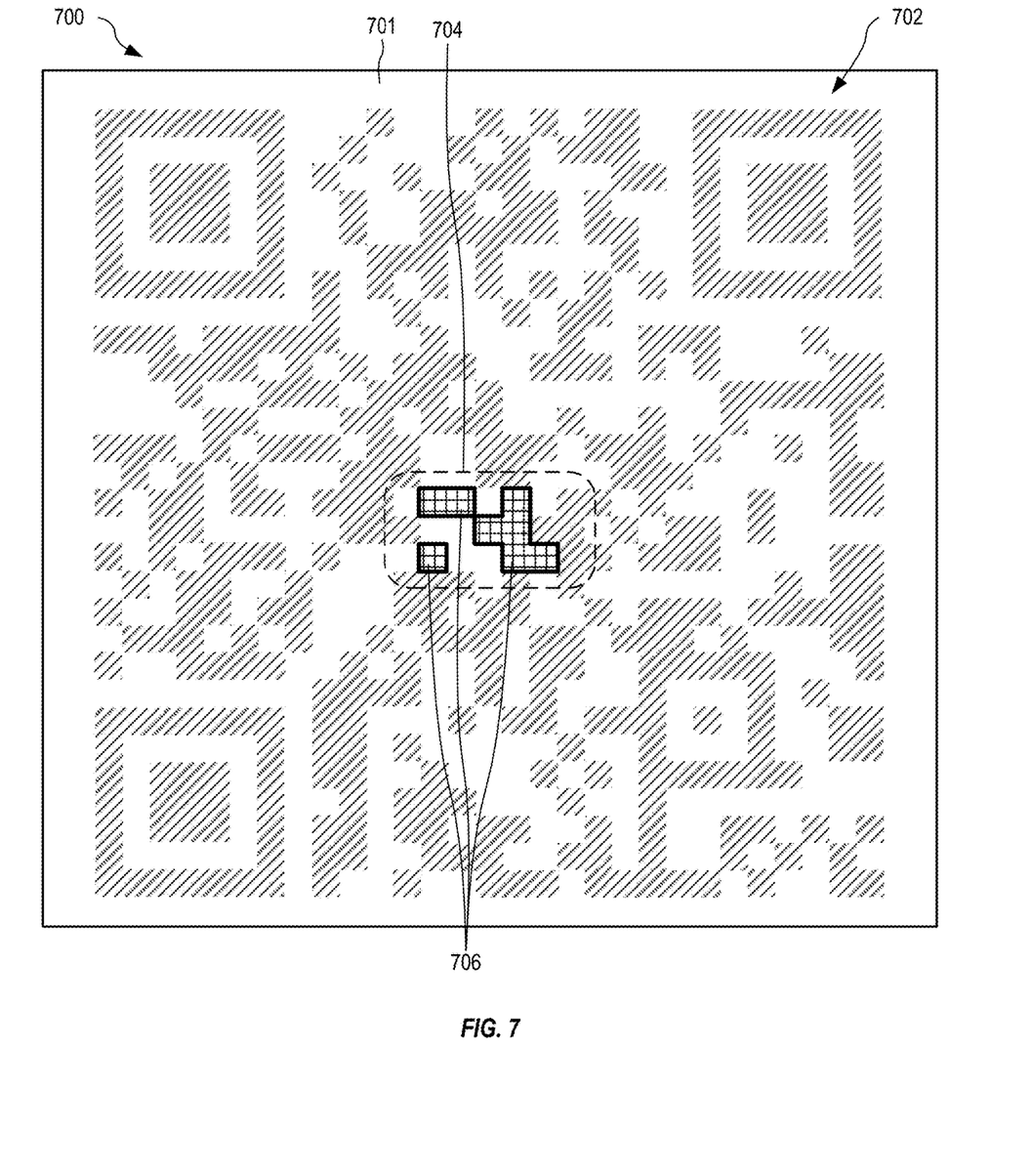
FIG. 7 shows one exemplary authenticable digital code that includes a machine-readable digital code and a security code area formed on a printable medium, in an embodiment.

FIG. 7 shows one exemplary authenticable digital code 700 that includes a machine-readable digital code 702 and a security area 704 formed on a printable medium 701. Machine-readable digital code 702 is similar to machine-readable digital code 202 of FIG. 2, and represents a QR code in this example. Security area 704 is positioned relative to machine-readable digital code 702 and includes a fluorescent material 706 that, in response to light of a first frequency, emits light at a second frequency. In one embodiment, fluorescent material 706 emits red light when illuminated by blue light. Fluorescent material 706 may also be configured such that, when illuminated by regular white light, security area 704 is not easily discerned from markings of machine-readable digital code 702.

Fluorescent material 706 provides authentication levels similar to those described above, based upon presence, and optionally position, of fluorescent material 706 with machine-readable digital code 702. That is, wherein detection of fluorescence from fluorescent material 706 at a second frequency (e.g., red) when illuminated by light at a first frequency (e.g., blue) indicates a first level of authenticity of authenticable digital code 700, and position of the detected fluorescence relative to machine-readable digital code 702 indicates a second level of authenticity.

Further, location of detected fluorescence from fluorescent material 706 is decoded, based upon position of detected fluorescent material 706 within security area 704 (e.g., similar to decoding of machine-readable digital code 702), to generate a security code value (e.g., security code value 338 stored in memory 306 of FIG. 3). This security code value 338 provides a next level of authentication. In the example of FIG. 7, security area 704 contains twenty-one whole areas that correspond to bits of security code value, where presence of fluorescent material 706 indicates a corresponding bit value of one. Security area 704, and thereby the number of bits contained therein, may be greater or fewer without departing from the scope hereof. Further, security area 704 may include error identification and/or error correction bits without departing from the scope hereof.

In one embodiment, security code value 338 is a checksum value for information contained within machine-readable digital code 702.

In one embodiment, security code value 338 is used to further decode information contained within machine-readable digital code 702. For example, security code value 338 may provide a hash value for decrypting data read from machine-readable digital code 702 to produce useful information. That is, conventional reading of machine-readable digital code 702 provides a character sequence that is meaningless until decrypted using security code value 338 with a decryption algorithm.

Figure 8:
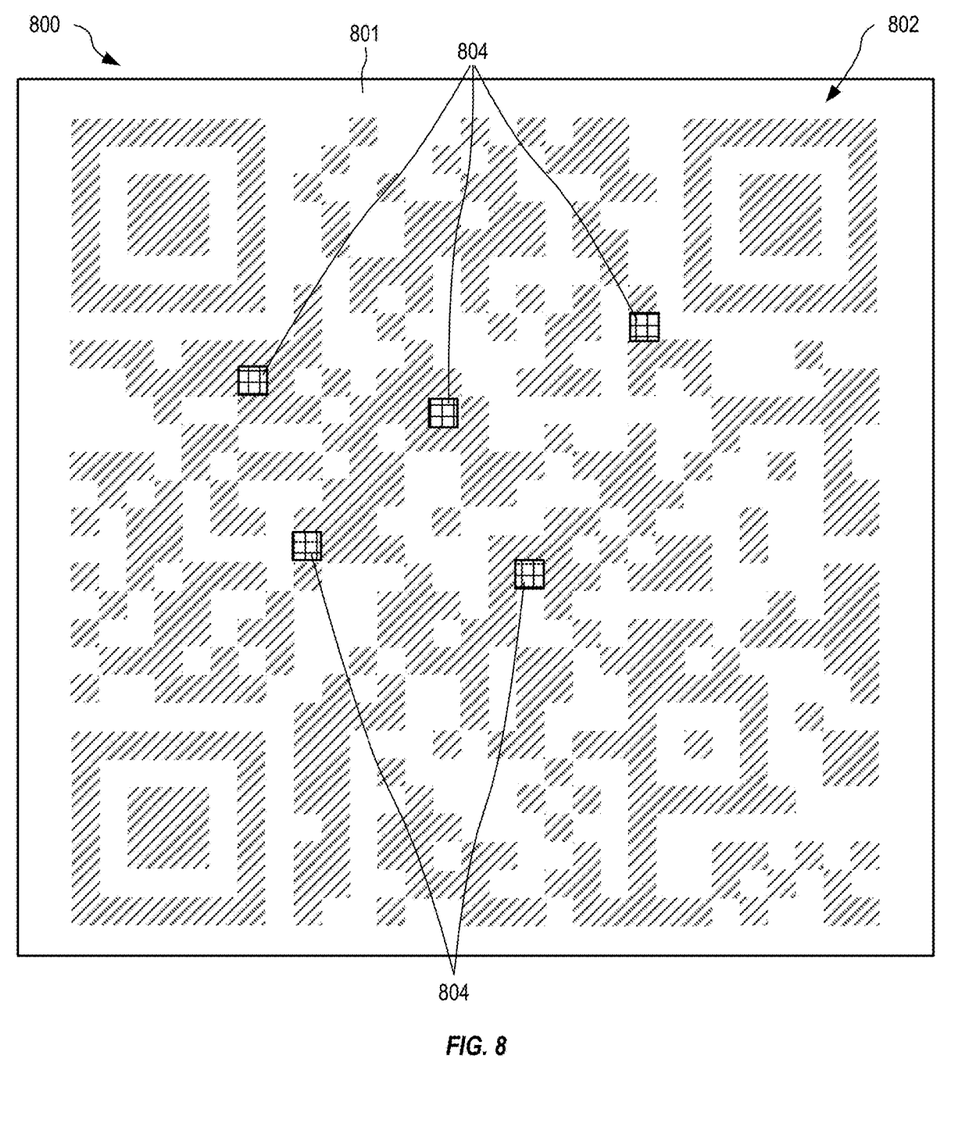
FIG. 8 shows one exemplary authenticable digital code that includes a machine-readable digital code and a distributed security code area formed on a printable medium, in an embodiment.

FIG. 8 shows one exemplary authenticable digital code 800 that includes a machine-readable digital code 802 and a distributed security code area containing a distributed security code value formed on a printable medium 801. Authenticable digital code 800 is similar to authenticable digital code 700, wherein location of detected fluorescence from a fluorescent material 804 is used to determine a security code value (e.g., security code value 338). Other areas and methods of decoding fluorescence from fluorescent material 804 based upon location of the detected fluorescence relative to machine-readable digital code 802 may be used without departing from the scope hereof.

In another embodiment, not shown, fluorescent material 804 defines one or more position markers and alignment markers, such that information may be decoded from detected fluorescence without reference to machine-readable digital code 802. That is, fluorescent material 804 is positioned independently of machine-readable digital code 802, and may be decoded without reference to machine-readable digital code 802.

Multiple Security Signatures

Figure 9:
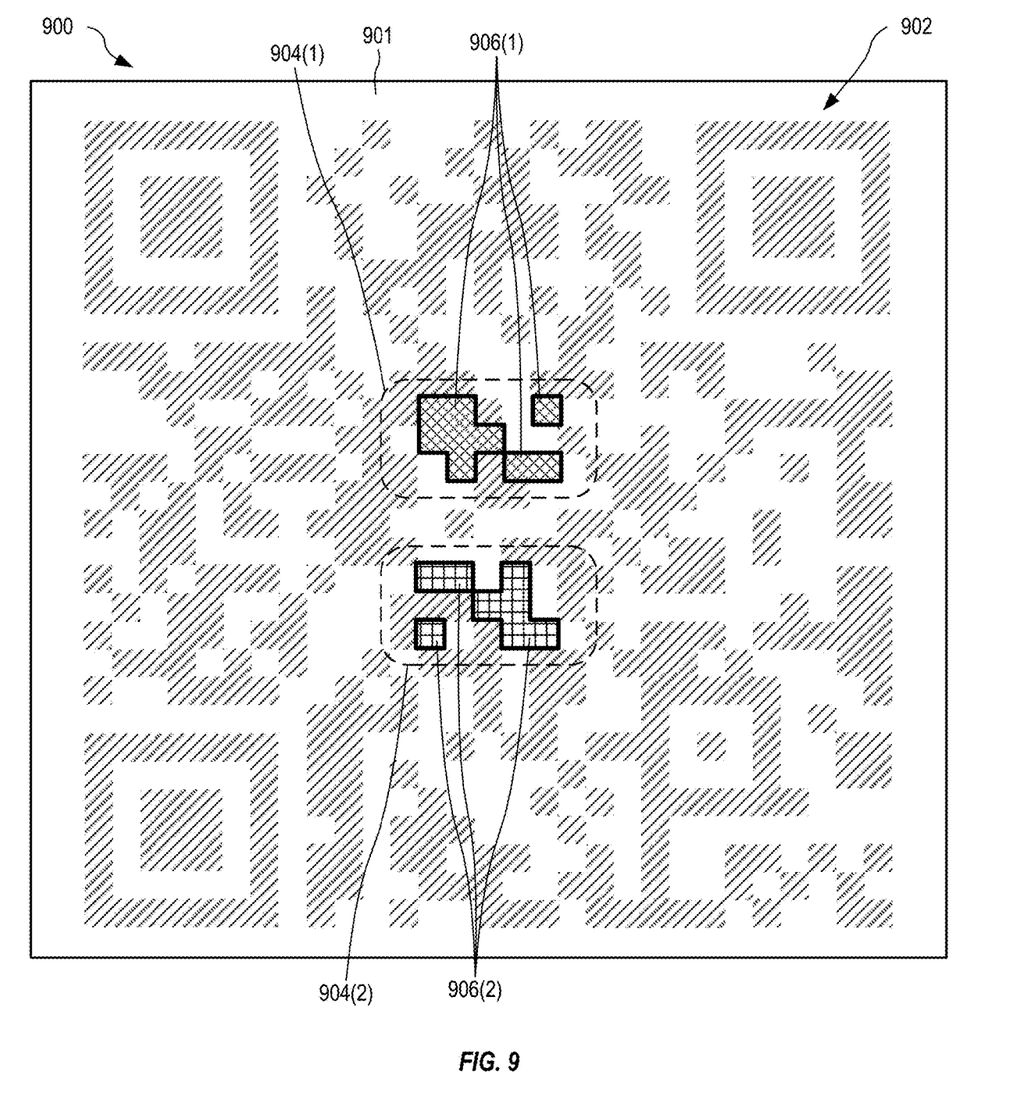
FIG. 9 shows one exemplary authenticable digital code that includes a machine-readable digital code and two security code areas formed on a printable medium, in an embodiment.

Advantageously, the use of display 310 to illuminate authenticable digital code 200 easily allows light of different wavelengths to be selectively used. FIG. 9 shows one exemplary authenticable digital code 900 that is similar to authenticable digital code 700 of FIG. 7, having a machine-readable digital code 902, and including two security areas 904(1), 904(2) that each includes a fluorescent material 906(1) and 906(2), formed on a printable medium 901.

Fluorescent material 906(1), in response to light of a first frequency, emits light at a second frequency. For example, fluorescent material 906(1) emits red light when illuminated by blue light. Fluorescent material 906(2), in response to light of a third frequency, emits light at a fourth frequency. For example, fluorescent material 906(2) emits green light when illuminated by blue light. Fluorescent materials 906 may also be configured such that, when illuminated by regular white light, security code areas 904 are not easily discerned from machine-readable digital code 902. As noted above, the phosphor may be formed as micro-dots that are coated with a thin colored pigment that modifies the appearance of the phosphor when not fluorescing. In an alternate embodiment, one of the two security areas 904(1), 904(2) is configured to emit light at an infra-red (IR) wavelength in response to light of a particular frequency, and camera 308 is configured to sense light at both visible and IR wavelengths (see for example FIG. 5 and associated description of Appendix B of U.S. Patent Application Ser. No. 62/354, 582).

Fluorescent materials 906 provide authentication levels similar to those described above, based upon presence, and optionally position, of fluorescent materials 906 with machine-readable digital code 902. That is, wherein detection of fluorescence from fluorescent material 906(1) at a second frequency (e.g., red) when illuminated by light at a first frequency (e.g., blue), and/or detection of fluorescence from fluorescent material 906(2) at a fourth frequency (e.g., green) when illuminated by light at the third frequency (e.g., blue) indicates a first level of authenticity of authenticable digital code 900, and position of the detected fluorescence relative to machine-readable digital code 902 indicates a second level of authenticity.

Further, location of detected fluorescence from fluorescent materials 906 is decoded, based upon position of detected fluorescent material 906 within security code areas 904 (e.g., similar to decoding of machine-readable digital code 902), to generate first and second security code values that operate together to for a next level of authentication.

Thus, the versatility of using a display 310 to emit light at desired frequencies allows the different phosphors to be easily detected and differentiated from machine-readable digital code 902. In one example of operation, authenticator 314 controls camera 308 to capture a first image of authenticable digital code 900 while controlling display 310 to emit white light. Authenticator 314 then controls camera 308 to capture a second image of authenticable digital code 900 while controlling display 310 to emit light at a first frequency, and then authenticator 314 controls camera 308 to capture a third image of authenticable digital code 900 while controlling display 310 to emit light at the third frequency. Authenticator 314 then uses one or more of de-blur algorithm 316, de-skew algorithm 318 and decode algorithm 320 to decode each of the first, second and third captured images.

Information decoded from each security code area 904(1) and 904(2) may then be used as additional authentication values, or may be used to unencrypt information of machine-readable digital code 902.

Figure 10:
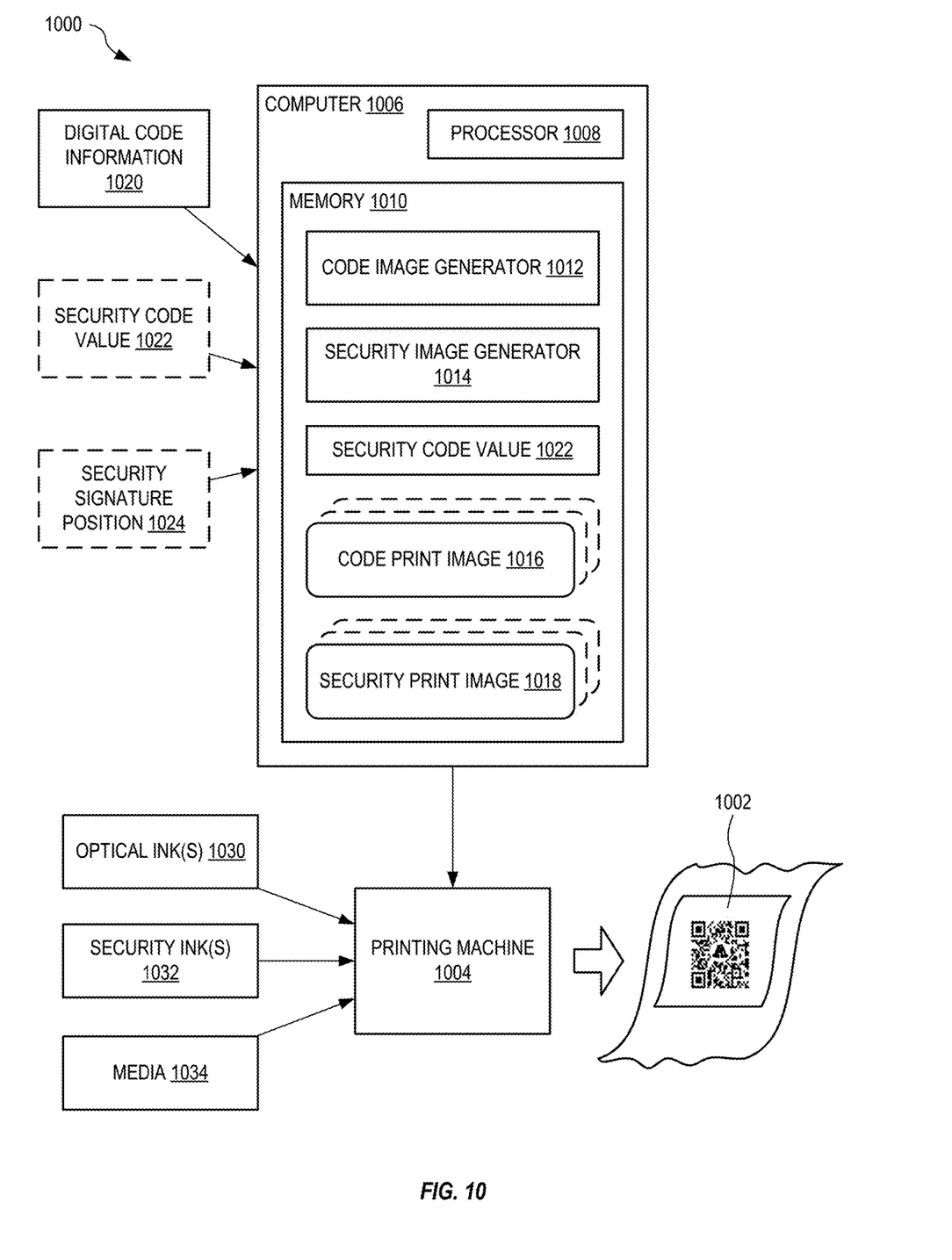
FIG. 10 shows one exemplary system for producing the authenticable digital code of FIGS. 2, 5, 7, 8, and 9, in an embodiment.

FIG. 10 shows one exemplary system 1000 for generating an authenticable digital code 1002. Authenticable digital code 1002 may represent one or more of authenticable digital codes 200, 700, 800, and 900 of FIGS. 2, 5, 7, 8 and 9, respectively.

System 1000 includes a printing machine 1004 and a computer 1006 that includes a processor 1008 communicatively coupled with a memory 1010. A code image generator 1012 includes machine-readable instructions that are stored within memory 1010 and executed by processor 1008 to generate one or more code print images 1016 that correspond to the machine-readable digital code (e.g., machine-readable digital code 202, 702, 802, and 902) portion of authenticable digital code 1002. For example, code image generator 1012 may receive digital code information 1020 from an external source and automatically generate one or more code print images 1016 therefrom using an algorithm. In one embodiment, generator 1012 encrypts digital code information 1020 based upon a security code value 1022 (optionally received from an external source) and thus, information within the machine-readable digital code of code 1002 does not directly reflect digital code information 1020. Where printed using a CMYK process, known in the art, code print images 1016 may be formed of four registered images, one for each of cyan, magenta, yellow, and black.

Computer 1006 also includes a security image generator 1014 that includes machine-readable instructions stored in memory 1010 and executed by processor 1008 to generate a security print image 1018 based upon one or both of security code value 1022 and a security signature position 1024. For example, where code 1002 represents code 200 of FIG. 2, generator 1014 utilizes security signature position 1024 to generate image 1018 with security signature 204 positioned relative to machine-readable digital code 202 within image 1016.

In another example, where code 1002 represents codes 700 and 900 of FIGS. 7 and 9, generator 1014 utilizes security signature position 1024 and security code value 1022 to generate image 1018 with a security code area (e.g., security code areas 704 and 904) positioned relative to machine-readable digital code 202 within image 1016 and defining position of fluorescent material (e.g., fluorescent materials 706 and 906) based upon security code value 1022, respectively.

Code print images 1016 and security print images 1018 are then used (either directly or indirectly through use of plates and screens generated from images 1016 and 1018) by printing machine 1004 to print code 1002 using optical inks 1030, security inks 1032 into a medium 1034. Security inks 1032 contain specifically selected phosphor(s) that fluoresce when illuminated by visible light of a certain color. Printing machine 1004 is for example a conventional printing apparatus using CMYK type printing where the security ink(s) 132 are printed in an additional printing step (e.g., CMYK+ONE), as known in the art of printing, that, by using security inks 1032, may be used to print authenticable digital code 1002. Where two or more different fluorescent materials (e.g., phosphors, or coated phosphor micro-dots) are used for two or more different security codes (see code 900 of FIG. 9), additional print steps may be added. Further, a top layer may be added to code 1002 for protection against moisture and wear, as known in the art of printing.

Figure 11:
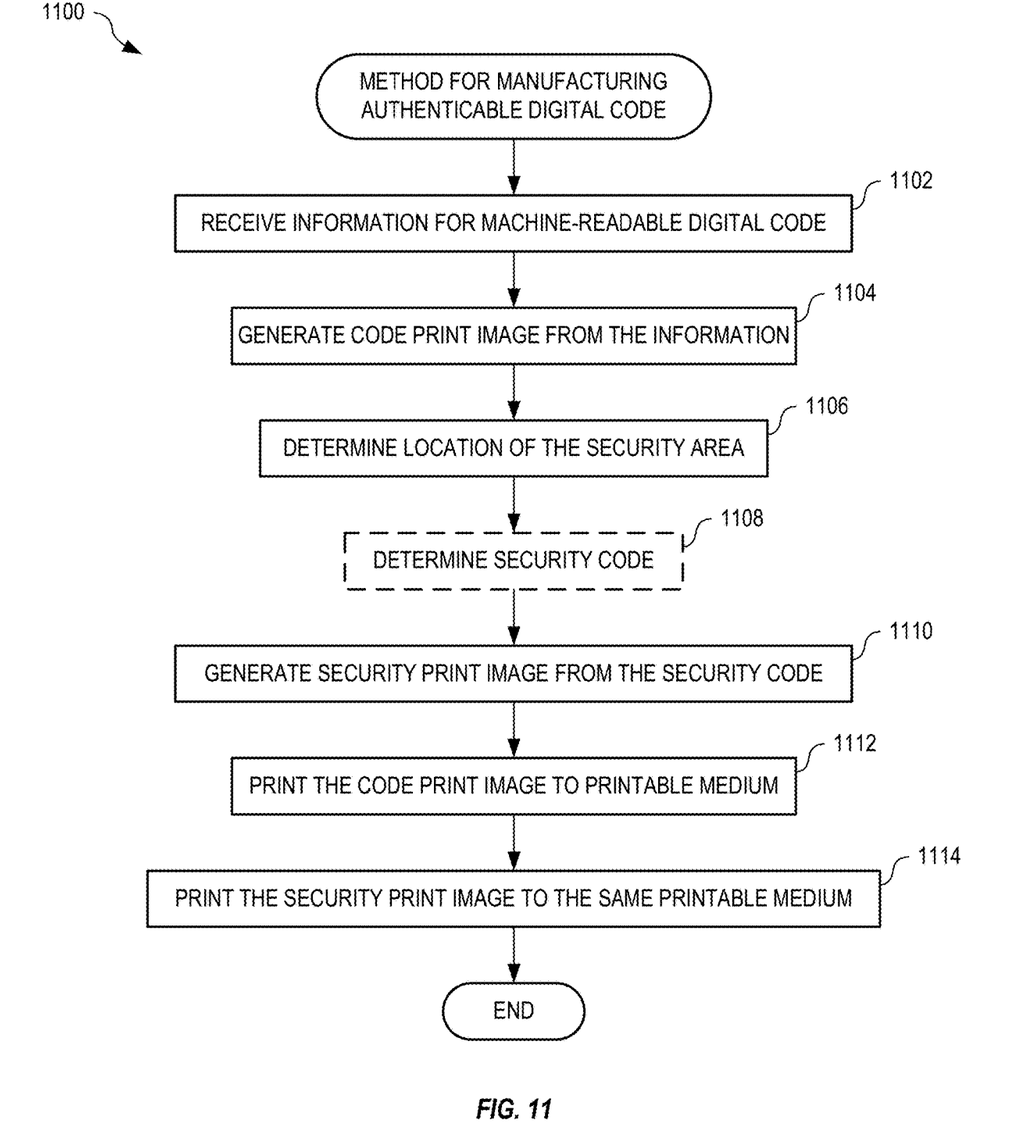
FIG. 11 is a flowchart illustrating one exemplary method for generating an authenticable digital code, in an embodiment.

FIG. 11 is a flowchart illustrating one exemplary method 1100 for manufacturing an authenticable digital code. Method 1100 is for example implemented within generators 1012 and 1014 of computer 1006 and printing machine 1004 of system 1000 of FIG. 10.

In step 1102, method 1100 receives information for the machine-readable digital code. In one example of step 1102, computer 1006 receives digital code information 1020. In step 1104, method 1100 generates a machine-readable digital code from the information. In one example of step 1104, code image generator 1012 generates code print image 1016 based upon a graphical representation of digital code information 1020. In another example of step 1104, code image generator 1012 first encrypts digital code information 1020 based upon security code value 1022, and then generates code print image 1016 as a graphical representation of the encrypted information.

In step 1106, method 1100 determines a location of the security area. In one example of step 1106, security image generator 1014 determines a location of security signature 204 relative to machine-readable digital code 202 based upon information within digital code information 1020. In another example of step 1106, security image generator 1014 determines a location of security area 704 (or security areas 904) based upon digital code information 1020. In another example of step 1106, a location of security areas 704, 904, is predefined within security image generator 1014.

Step 1108 is optional. If included, in step 1108, method 1100 determines the security code. In one example of step 1108, security image generator 1014 determines security code value 1022 from received input. In another example of step 1108, security code value 1022 is predefined within security image generator 1014. In another example of step 1108, security image generator 1014 determines security code value 1022 from digital code information 1020.

In step 1110, method 1100 generates security print image from the security code. In one example of step 1110, security image generator 1014 generates security print image 1018 based upon security code value 1022.

In step 1112, method 1100 prints the code print image to a printable medium. In one example of step 1112, printing machine 1004 is controlled to print code print image(s) 1016 to medium 1034. In step 1114, method 1100 prints the security print image to the same printable medium. In one example of step 1114, printing machine 1004 is controlled to print security print image(s) 1018 to medium 1034, registered to the printed code print image 1016.

Steps of method 1100 may be performed in a different order without departing from the scope hereof.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An authenticable digital code, comprising:
   a printable medium;
   a machine-readable digital code, formed on the printable medium, that graphically represents information; and
   at least one security signature comprising a fluorescent material that, when excited by first light at a first wavelength, fluoresces and emits second light at a second wavelength, that is different from the first wavelength, the second light emitting a graphical representation of a security code value that indicates authenticity of the authenticable digital code.

2. The authenticable digital code of claim 1, the fluorescent material being configured to fluoresce and emit the second light based upon the first light being generated by a display of a mobile device without additional light sources or filters.

3. The authenticable digital code of claim 1, the first wavelength corresponding to a blue color and the second wavelength corresponding to a red color.

4. The authenticable digital code of claim 1, the machine-readable digital code being selected from the group consisting of a barcode, a matrix code, and a QR code.

5. The authenticable digital code of claim 1, the security code value being based upon the information.

6. The authenticable digital code of claim 1, the information being encrypted and associated with the security signature such that the information may be decrypted using the security code value.

7. The authenticable digital code of claim 1, the security signature further comprising a second graphical representation of a second security code value that further indicates authenticity of the authenticable digital code.

8. The authenticable digital code of claim 7, the second graphical representation being printed to the printable medium using a second fluorescent material, that, when excited by third light of a third wavelength that is different from the first and second wavelengths, fluoresces and emits fourth light at a fourth wavelength that is different from the first, second and third wavelengths, the fourth light at a second position relative to the machine-readable digital code indicating authenticity of the authenticable digital code.

9. The authenticable digital code of claim 1, the first and second wavelengths corresponding to visible light.

10. A system for authenticating an authenticable digital code, comprising:
    a processor;
    a non-transitory memory communicatively coupled with the processor;
    a camera controlled by the processor and having a field of view;
    a light emitting display controlled by the processor that emits first light into the field-of-view of the camera; and
    software comprising machine-readable instructions stored in the memory that, when executed by the processor, are capable of:
      controlling the light emitting display to emit the first light of a first wavelength;
      controlling the camera to capture an image of the authenticable digital code positioned within the field of view and illuminated by the first light;
      analyzing the image to detect second light of a second wavelength resulting from fluorescence of a security signature on the authenticable digital code to determine a security code value; and
      decoding and authenticating the authenticable digital code based upon the security code value and the second wavelength.

11. The system of claim 10, the processor, the memory, the light emitting display and the camera being part of a device selected from the group of mobile devices consisting of a smartphone, a tablet computer, a laptop computer, a notebook computer, an MP3 player, and a personal digital assistant.

12. The system of claim 10, the software further comprising machine-readable instructions that when executed by the processor are capable of de-blurring the first image when the authenticable digital code is positioned outside a focusing range of the camera.

13. The system of claim 10, the first and second wavelengths corresponding to visible light.

14. A method for authenticating an authenticable digital code, comprising the steps of:
    controlling a light emitting display to emit first light of a first wavelength;

controlling a camera to capture an image of the authenticable digital code illuminated by the first light;

analyzing the image to detect second light of a second wavelength within the image and resulting from fluorescence of a security signature of the authenticable digital code;

determining a security code value based upon the second light; and decoding and authenticating the machine-readable digital code of the authenticable digital code based upon the second light and the security code value.

\* \* \* \* \*